United States Patent [19]
Hertzell

[11] 3,718,357
[45] Feb. 27, 1973

[54] RETRACTABLE SIDE BUMPER GUARD

[76] Inventor: Adelbert F. Hertzell, 5024 Lee Street, Skokie, Ill. 60076

[22] Filed: Oct. 26, 1971

[21] Appl. No.: 192,233

[52] U.S. Cl. ..........................293/9, 293/21, 293/62, 293/73
[51] Int. Cl. ......B60r 19/04, B60r 21/02, B61f 19/04
[58] Field of Search ......52/717; 293/1, 9, 21, 28, 62, 293/73

[56] References Cited

UNITED STATES PATENTS

| | | | |
|---|---|---|---|
| 1,523,978 | 1/1925 | Rougeot | 293/62 |
| 1,708,804 | 4/1929 | Schulman | 293/62 |
| 1,753,483 | 4/1930 | Stevens | 293/62 X |
| 2,212,493 | 8/1940 | Brunken | 293/62 X |
| 2,274,440 | 2/1942 | Tozier | 293/73 X |
| 2,512,527 | 6/1950 | Hoffman | 293/62 |
| 2,785,921 | 3/1957 | Barenyi | 296/28 R |
| 3,355,208 | 11/1967 | Brock | 293/9 |
| 3,388,523 | 6/1968 | Evans | 52/717 |
| 3,596,962 | 8/1971 | Hertzell | 293/62 X |

*Primary Examiner*—Gerald M. Forlenza
*Assistant Examiner*—Howard Beltran
*Attorney*—Roy H. Olson et al.

[57] ABSTRACT

A bumper guard assembly apparatus to be attached to an automobile comprising a bumper guard and means to move the bumper guard in one direction when the apparatus is in use and in an opposite direction when the apparatus is not in use, whereby the same need not be completely detached from the automobile at any time.

3 Claims, 6 Drawing Figures

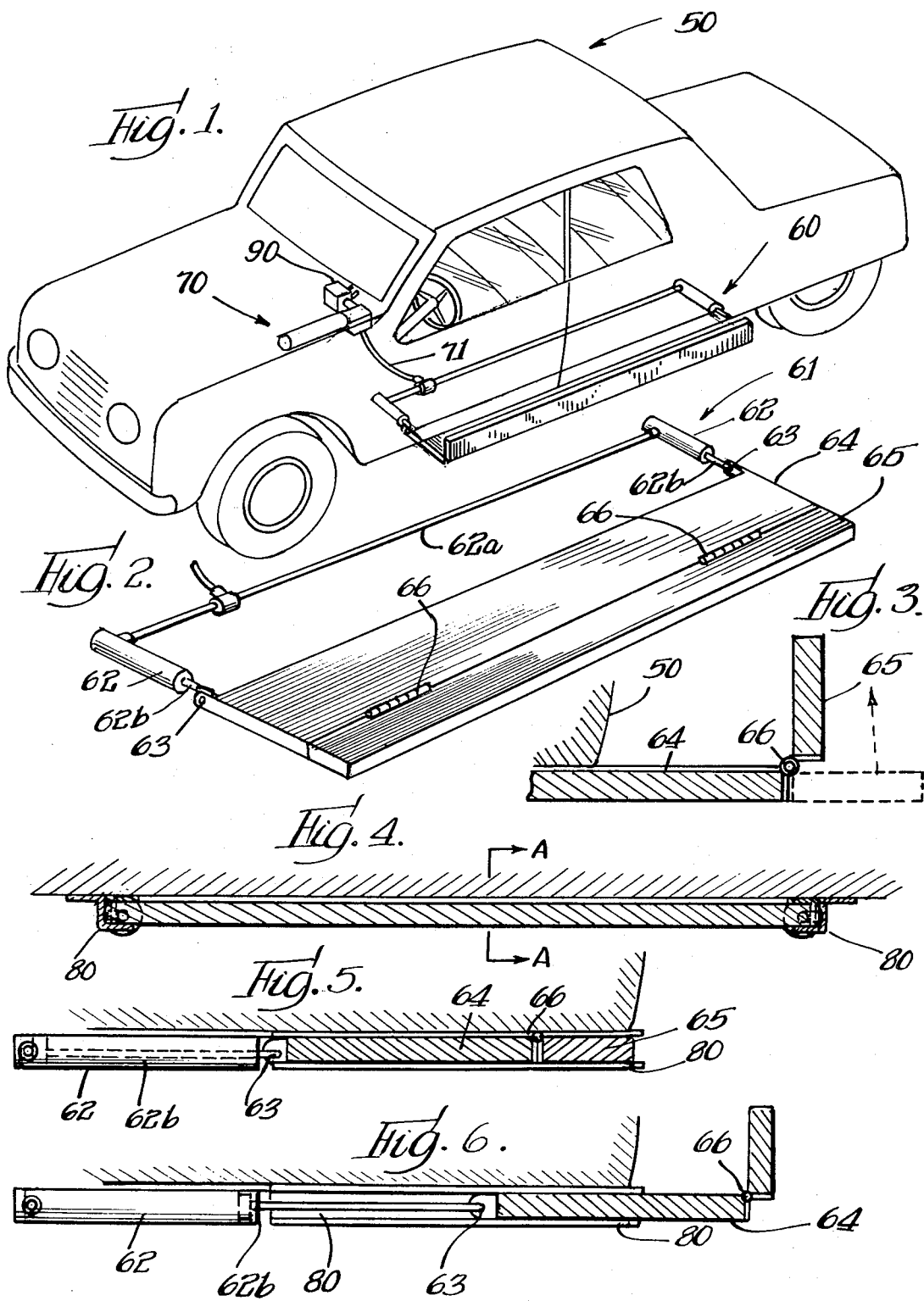

3,718,357

RETRACTABLE SIDE BUMPER GUARD

SUMMARY OF THE INVENTION

This invention relates broadly to protective devices for vehicles and more particularly to bumper guards which protect an automobile from scratches and dents due to external forces.

DISTINCTION OVER PRIOR ART AND OBJECTS

In the past, side bumpers for automobile bodies have been disclosed in accordance with U.S. Pat. No. 2,212,493. A common problem in the prior art bumper guard assemblies is the necessity to detach the bumper assembly from the car when the bumper is not used as a protective measure. This is necessary because the bumper structure does not allow entry into the auto while still attached. As displayed in U.S. Pat. No. 2,212,493, a bumper bar and its component parts are affixed to the side of an automobile by rigidly attaching a clamp to the door handle of the car. The bar which is made of one section extends across the side of the car preventing access therein by means of the car doors. In order for one to enter the car through the doors, the bumper structure necessitates complete removal of the bar and its component parts from the side of the car. This not only causes the inconvenience of requiring complete removal but also necessitates the added inconvenience of storing of the bumper structure while the automobile is in use.

Therefore, a general object of the present invention is to provide an improved side bumper for an automobile which overcomes the limitations of the prior art by providing a foldable bumper assembly which does not necessitate detachment from the automobile while the bumper assembly is not in use.

The bumper guard assembly herein claimed and disclosed comprises generally a section which may be semi-permanently affixed to a portion of an automobile and a second section which is movably affixed to the first section such that the movable section may be moved in one direction when body protection is desired and in an opposite direction allowing access into the automobile when body protection is no longer desired.

In the present embodiment of my invention a bumper guard assembly is permanently fastened to the underside of an automobile. The assembly particularly comprises a baseboard and sub-baseboard which may be moved from a position entirely under the automobile when not in use to a position protruding out from the side of the automobile when it is desired to use the assembly as a protective device. When the baseboard and sub-baseboard are no longer to be so used, they may, by appropriate means, be moved back into their original position underneath the automobile by an appropriate actuation device.

There is no necessity to remove the bumper guard structure from the automobile when not in use. It can also be seen that this will not hinder free access into the automobile when so desired.

Additional objects and features of the invention will be apparent from the detailed disclosure which follows:

BRIEF DESCRIPTION OF FIGURES

FIG. 1 is a perspective view of an automobile with a bumper guard of the present invention attached on the underside of the automobile. The bumper guard assembly is in its protective position with its power source and control means in an accessible position located on the automobile;

FIG. 2 is a perspective view of the bumper guard assembly alone;

FIG. 3 is a side sectional view of the assembly in both its protective and unprotective (dashed lines) position;

FIG. 4 is a side view of the underside of an automobile with the bumper guard assembly in its retracted position;

FIG. 5 is a front sectional view of the underside of the automobile showing the bumper guard assembly in its non-protective position taken along the line A—A of FIG. 4; and FIG. 6 is the same as FIG. 5 except the bumper guard assembly is in its protective position.

DETAILED DESCRIPTION

Referring now in detail to the drawings and FIGS. 1 through 6, a bumper guard assembly according to the present invention is shown. FIG. 1 specifically displays an automobile 50 in combination with a bumper guard assembly 60, power source 70 and control valves 90 which supply power to and move the bumper guard assembly 60. As shown in FIG. 1 in its protective position the bumper guard assembly is attached to the underside of the automobile with a portion extending out from beneath the automobile. The power source 70 may be located in a convenient position within the automobile as shown with power leads 71 extending from the power source to the bumper assembly 60. The controls 90 are conveniently positioned on the automobile for easy actuation from outside the automobile.

Details of the bumper assembly 60 may be seen in FIGS. 2 and 3. The assembly comprises a drive element 61 which includes pneumatic cylinder and piston assemblies 62 connected together by an airline 62a. The pistons 62b of the assemblies 62 are operatively connected at point 63 to the ends of a flat rectangularly shaped baseboard 64. The rectangular baseboard 64 lies in a flat position parallel with the ground. A similarly shaped sub-baseboard 65 is attached to the side of the baseboard 64 away from drive element 61 by means of two spring hinges 66. The spring hinges 66 bias sub-baseboard 65 in a vertical and perpendicular position with respect to the baseboard. FIG. 3 specifically shows the sub-baseboard 65 tending to go from its forced-down position (dashed lines) to its natural position (solid lines), the spring-urged pivoting being indicated by the arrow.

In operation, when the drive element 61 is energized by actuation of control valves 90 in the airline 62a pistons 62b5 which are directly attached to the baseboard at point 63 are moved in an inward and outward direction thus moving the baseboard and sub-baseboard in a direction to and away from the drive element. When the baseboard 64 and sub-baseboard 65 are moved away from the drive element 61 by pistons 62b the bumper guard assembly is in its protective position. As shown in FIG. 1 a portion of the baseboard and the entire sub-baseboard extend out from beneath the side of the automobile and the sub-baseboard is thus free to move into its biased position due to the biased spring hinges 66. When it is desired to free the automobile from bumper guard protection, the drive element 61 is actuated to move the baseboard and sub-baseboard in a direction towards the driving element such that the entire baseboard and sub-baseboard lie completely beneath the automobile. As the sub-baseboard in its vertical perpendicular position with respect to the baseboard moves towards the drive element and therefore the automobile, the sub-baseboard comes in contact with the protruding portion of a channel 80 on which it rides and continued movement inward thus forces the sub-baseboard into its inactive or storage position parallel to the baseboard. Further movement towards the drive element completely hides the baseboard and sub-baseboard beneath the automobile.

Details of how the baseboard 64 and sub-baseboard 65 are moved away from and to the drive element 61 are shown in FIGS. 4, 5 and 6. Attached to the underside of the automobile and protruding out thereof are channels 80 which are so positioned to allow the baseboard 64 and sub-baseboard 65 to ride along the channels away from and towards the drive element 61. The drive element 61 is attached to the underside of the automobile in a conventional manner. FIG. 5 specifically shows the bumper guard assembly in its retracted position with the baseboard and sub-baseboard located completely under the automobile. FIG. 6 shows the bumper guard assembly in its protective position with baseboard 64 partially beneath the car and partially extending outward along the channels 80 with the sub-baseboard 65 completely out from beneath the automobile and in its biased position.

From the above discussion of the bumper guard assembly herein disclosed, it can be seen that there is no necessity to remove the assembly entirely from the automobile when the assembly is not to be used as is the case in the prior art. While outside of the automobile, mere actuation of control valves which are located in an accessible position will move the entire structure to a position completely beneath the automobile and thus allow free access into the automobile. When bumper guard protection is desired, a mere flick of the control switch will transport the portion of the bumper guard assembly out from beneath the automobile as discussed above and thus protection is attained.

While a particular embodiment of the invention has been shown, it should be understood of course that the invention is not limited thereto since many modifications such as electric or manually controlled drive elements may be made and it is therefore contemplated to cover by the present application any such modifications as fall within the true spirit and scope of the appended claims.

The invention is claimed as follows:

1. Retractable bumper guard assembly apparatus to be used in combination with an automobile body, comprising baseboard means; horizontal channel means attached beneath said automobile body; power operated driving means operatively connected to said baseboard means and to said automobile body for moving said baseboard means in a direction along said channel means away from and towards the fixed portion of said driving element and at least partially past one end of the channel and outside the automobile body; and sub-baseboard means pivotally connected to said baseboard means and on the opposite side of said driving means.

2. Retractable bumper guard assembly apparatus as claimed in claim 1 wherein said driving means comprise multiple pneumatic cylinder and piston assembly means; an air line connecting said multiple assembly means; and power supply and control means connected to said air line whereby actuation of said control means energizes said driving means for moving said baseboard means.

3. Retractable bumper guard assembly apparatus as claimed in claim 1 wherein said sub-baseboard means is connected to said baseboard means by spring biased hinges whereby said sub-baseboard means is biased in a vertical and perpendicular position with respect to said baseboard means when automobile protection is desired and may be forced into a horizontal position with respect to said baseboard by the end of the channel when protection is no longer desired.

* * * * *